(12) United States Patent
Mishra et al.

(10) Patent No.: US 10,015,066 B2
(45) Date of Patent: Jul. 3, 2018

(54) PROPAGATION OF FRAME LOSS INFORMATION BY RECEIVER TO SENDER IN AN ETHERNET NETWORK

(71) Applicant: Ciena Corporation, Hanover, MD (US)

(72) Inventors: Rajneesh Mishra, Gurgaon (IN);
Prashant Vashisht, Gurgaon (IN);
Jayant Bhardwaj, New Delhi, IN (US); Vikas Trivedi, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 142 days.

(21) Appl. No.: 15/072,445

(22) Filed: Mar. 17, 2016

(65) Prior Publication Data

US 2017/0230265 A1 Aug. 10, 2017

(30) Foreign Application Priority Data

Feb. 4, 2016 (IN) .............................. 201611003987

(51) Int. Cl.
*H04L 12/26* (2006.01)
*H04L 12/24* (2006.01)
*H04L 12/911* (2013.01)

(52) U.S. Cl.
CPC .......... *H04L 43/0829* (2013.01); *H04L 41/06* (2013.01); *H04L 41/0672* (2013.01);
(Continued)

(58) Field of Classification Search
CPC ............... H04L 29/08; H04L 29/08027; H04L 2012/5612; H04L 2012/5625; H04L 2012/5628; H04L 1/0082; H04L 1/16; H04L 1/201; H04L 67/16; H04L 49/555; H04L 47/115; H04L 43/0823; H04L 43/0829–43/0847; H04L 43/10; H04L 43/103–43/106; H04L 43/12; H04L 41/0213; H04L 41/046; H04L 41/048;
(Continued)

(56) References Cited

U.S. PATENT DOCUMENTS

| 8,306,039 B2 | 11/2012 | Saksena et al. |
| 2005/0099951 A1 | 5/2005 | Mohan et al. |

(Continued)

OTHER PUBLICATIONS

Congdon, Paul et al., "Link Layer Discovery Protocol", Frame Expansion Study Group, Ottawa, Sep. 30, 2004, pp. 1-17.
(Continued)

*Primary Examiner* — Joshua Kading
(74) *Attorney, Agent, or Firm* — Clements Bernard Walker PLLC; Christopher L. Bernard; Lawrence A. Baratta, Jr.

(57) ABSTRACT

Systems and methods of propagating frame loss information by a node in an Ethernet network include detecting one or more of service unaware port discards and service aware port discards; determining statistics based on the one or more of service unaware discards and service aware port discards; and transmitting the determined statistics to a sender node through one of a Link Layer Discovery Protocol Data Unit (LLDPDU) and a Link Trace Message (LTM). The LLDPDU and the LTM can include an organization specific Type-Length-Value (TLV) with a TLV information string therein based on the determined statistics and cause of the one or more of service unaware discards and service aware port discards.

14 Claims, 11 Drawing Sheets

(52) U.S. Cl.
CPC .......... *H04L 41/0816* (2013.01); *H04L 41/26* (2013.01); *H04L 47/728* (2013.01); *Y02D 30/30* (2018.01); *Y02D 30/32* (2018.01)

(58) Field of Classification Search
CPC ... H04L 41/06; H04L 41/0686; H04L 41/069; H04L 41/5058; H04L 41/0672; H04L 41/0816; H04L 47/728
See application file for complete search history.

(56) References Cited

U.S. PATENT DOCUMENTS

| | | | |
|---|---|---|---|
| 2011/0199929 A1* | 8/2011 | Guo | H04L 43/0829 370/252 |
| 2013/0275568 A1* | 10/2013 | Nguyen | H04L 41/0806 709/223 |
| 2014/0071825 A1 | 3/2014 | Chhabra et al. | |
| 2014/0247829 A1 | 9/2014 | Gautam et al. | |
| 2014/0369177 A1* | 12/2014 | Keesara | H04L 43/0811 370/216 |
| 2016/0344617 A1* | 11/2016 | Gopalarathnam | H04L 45/22 |

OTHER PUBLICATIONS

"Operation, administration and maintenance (OAM) functions and mechanisms for Ethernet-based networks", International Telecommunication Union, Aug. 2015, pp. 1-102.
"Ethernet ring protection switching", International Telecommunication Union, Aug. 2015, pp. 1-82.

* cited by examiner

PROPAGATION OF FRAME LOSS INFORMATION BY RECEIVER TO SENDER IN AN ETHERNET NETWORK

CROSS-REFERENCE TO RELATED APPLICATION(S)

The present patent application/patent claims the benefit of priority of Indian Patent Application No. 201611003987, filed on Feb. 4, 2016, and entitled "PROPAGATION OF FRAME LOSS INFORMATION BY RECEIVER TO SENDER IN AN ETHERNET NETWORK," the contents of which are incorporated in full by reference herein.

FIELD OF THE DISCLOSURE

The present disclosure generally relates to networking systems and methods. More particularly, the present disclosure relates to the propagation of frame loss information by a receiver to a sender node in an Ethernet network. The frame loss information can include % drop and potential causes of the frame loss during reception and/or during forwarding.

BACKGROUND OF THE DISCLOSURE

In an Ethernet network, incoming frames may get discarded at an ingress port for a variety of reasons, such as Cyclic Redundancy Check (CRC) mismatch, alignment error, undersize or oversize frame size (even before mapping them to the services to which they belong), etc. Similarly, discards can occur by "no destination found," "Service level Quality of Service (QoS)," "Service Media Access Control (MAC) table limit exceed," etc. after ingress frames are mapped to associated services. These discards are known to a receiver node only (i.e., the node associated with the ingress port). Conventionally, some of these discards remain silent failures (other than statistics maintained at the receiver node). For some of these discards, the receiver node may report local alarms or traps to indicate traffic drops. Similarly, if the above discards in combination with service-specific drops happen at some intermediate transit node during frame transmit, frame loss measurement tools can be able to determine there is a loss of service frames somewhere in the network. For example, a loss measurement is described in IEEE Recommendation G.8013/Y.1731 (08/15) "OAM functions and mechanisms for Ethernet-based networks," the contents of which are incorporated by reference. However, there is no convenient conventional technique to isolate points of frame loss other than manual debugging.

BRIEF SUMMARY OF THE DISCLOSURE

In an exemplary embodiment, a method of propagating frame loss information by a node in an Ethernet network includes fetching one or more of service unaware discards and service aware port discards; determining statistics based on the one or more of service unaware discards and service aware port discards; and transmitting the determined statistics to a sender node through one of a Link Layer Discovery Protocol Data Unit (LLDPDU) and a LTM. The determined statistics can be utilized by the sender node to perform one or more corrective actions responsive to the determined statistics exceeding a threshold. The one or more corrective actions can include one or more of switching to backup Link Aggregation Group member ports, manipulating a blocking port in the Ethernet network, and raising an alarm. The LLDPDU can include an organization specific Type-Length-Value (TLV) with a TLV information string therein based on the determined statistics and cause of the one or more of service unaware discards.

The service unaware discards can be due to one or more of Cyclic Redundancy Check (CRC) mismatch, alignment error, and RUNT frames, prior to mapping packets to associated services, and the service aware port discards can be due to one or more of failure to find a destination, Service level Quality of Service (QoS), and exceeding Service Media Access Control (MAC) limit, during transit over a service in the Ethernet network. The one or more of service unaware discards can include service unaware discards prior to mapping packets to a service, and the transmitting is through LLDPDUs to the sender node which is an intermediate neighbor node. The determined statistics can include a percentage drop over a monitored interval. The one or more of service unaware discards and service aware port discards can include service aware port discards after to mapping packets to a service and in transit through the Ethernet network, and transmitting is through the LTM to the sender node where the packets ingress into the Ethernet network. The detecting can be responsive to a loss reported by a frame loss measurement tool and transmission of the LTM including an Organization specific TLV. The LTM can include an organization specific Type-Length-Value (TLV) querying one or more service unaware and service aware discards and the Link Trace Response (LTR) can include an organization specific Type-Length-Value (TLV) with a TLV information string based on the determined statistics and causes of one or more service unaware and service aware discards.

In another exemplary embodiment, a node adapted to propagate packet drop information in an Ethernet network includes circuitry adapted to fetch one or more of service unaware discards and service aware port discards; circuitry adapted to determine statistics based on the one or more of service unaware discards and service aware port discards; and circuitry adapted to transmit the determined statistics to a sender node through one of a Link Layer Discovery Protocol Data Unit (LLDPDU) and a LTM. The determined statistics can be utilized by the sender node to perform one or more corrective actions responsive to the determined statistics exceeding a threshold. The one or more corrective actions can include one or more of switching to backup Link Aggregation Group member ports, manipulating a blocking port in the Ethernet network, and raising an alarm. The LLDPDU can include an organization specific Type-Length-Value (TLV) with a TLV information string therein based on the determined statistics and cause of the one or more of service unaware discards.

The service unaware discards can be due to one or more of Cyclic Redundancy Check (CRC) mismatch, alignment error, and RUNT frames, prior to mapping packets to associated services, and the service aware port discards can be due to one or more of failure to find a destination, Service level Quality of Service (QoS), and Service Media Access Control (MAC) limit, during transit over a service in the Ethernet network. The one or more of service unaware discards can include service unaware discards prior to mapping packets to a service, and the transmitting is through LLDPDUs to the sender node which is an intermediate neighbor node. The determined statistics can include a percentage drop over a monitored interval. The one or more of service unaware discards and service aware port discards can include service aware port discards after to mapping packets to a service and in transit through the Ethernet network, and transmitting is through the LTM to the sender node where the packets ingress into the Ethernet network. The detecting can be responsive to a frame loss measurement and Link Trace Response (LTR) transmitted in response to the LTM.

In a further exemplary embodiment, an Ethernet network includes a plurality of interconnected nodes, wherein the plurality of interconnected nodes each includes circuitry adapted to fetch one or more of service unaware discards and service aware port discards, circuitry adapted to determine statistics based on the one or more of service unaware discards and service aware port discards, and circuitry adapted to transmit the determined statistics to a sender node through one of a Link Layer Discovery Protocol Data Unit (LLDPDU) and a LTM. The LLDPDU can include an organization specific Type-Length-Value (TLV) with a TLV information string therein based on the determined statistics and cause of the one or more of service unaware discards.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again in various exemplary embodiments, the present disclosure relates to the propagation of frame loss information by receiver to a sender node in an Ethernet network. The sender node could be an immediate neighbor or entry node of the service in a given administrator's network. The receiver could be next hop node as well as a transit node in the administrator's network. Specifically, systems and methods are described to propagate frame loss information to a sender or service ingress node. The systems and methods advantageously enable quick and efficient isolation of points of frame loss in an end-to-end service delivery. The systems and methods enhance Ethernet Operations, Administration, and Maintenance (OAM) capabilities on Ethernet nodes and network, enabling intelligence in debugging frame drop issues. Through the systems and methods, point(s) of frame loss and associated causes can be automatically determined for associated corrective actions. The systems and methods can enhance techniques described in IEEE 802.1ag "Connectivity Fault Management," (12/07); ITU Recommendation G.8013/Y.1731; and IEEE 802.1ab "Station and Media Access Control Connectivity Discovery," (04/05), the contents of each is incorporated by reference. Further, the systems and methods contemplate operation with various Ethernet services defined by the Metro Ethernet Forum (MEF) (online at www.mef.net).

Ethernet Network—Ingress Port Discards

Figure 1:
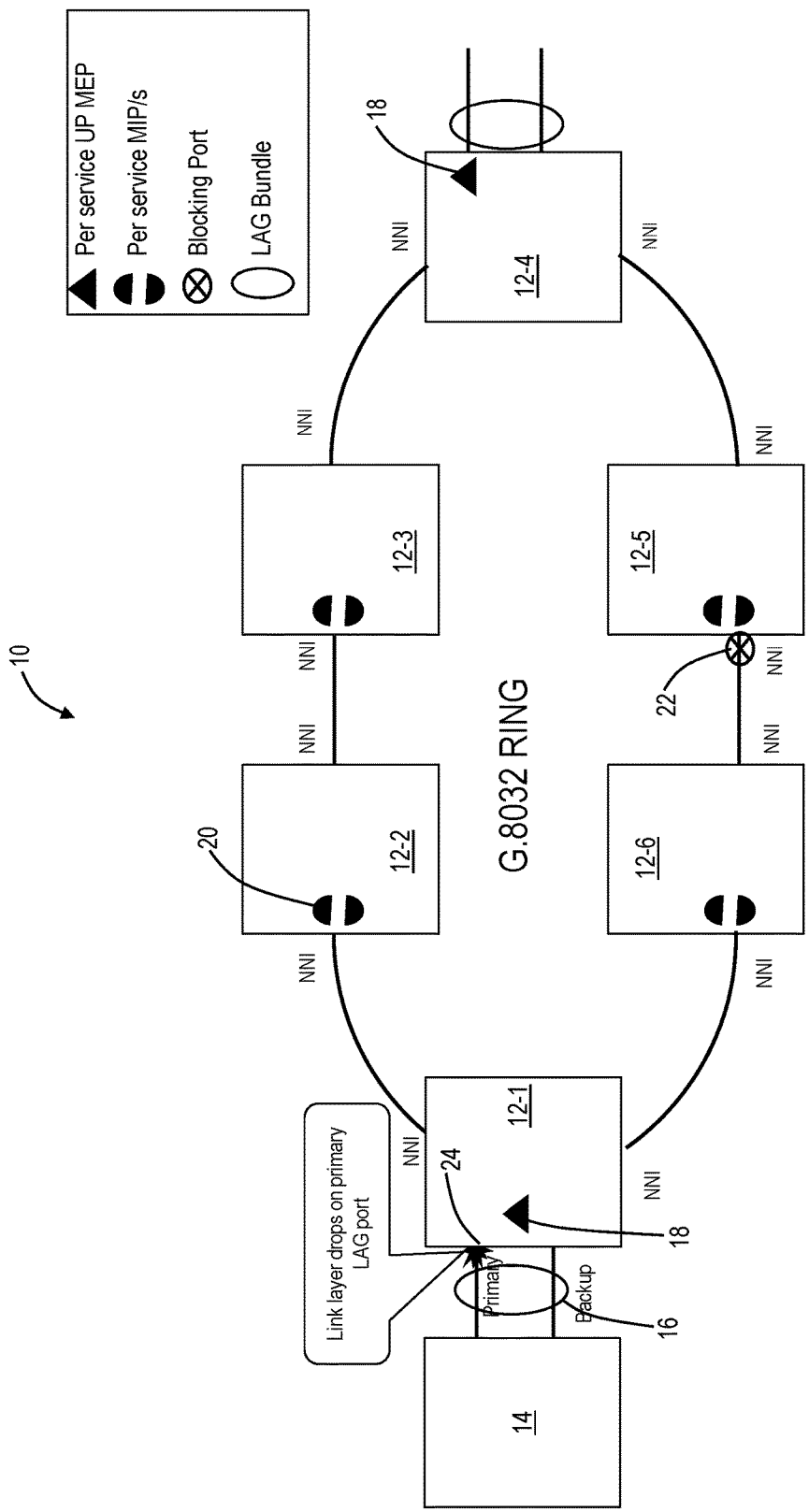
FIG. 1 is a network diagram of an Ethernet network with various nodes illustrating packet drops at network ingress.

Referring to FIG. 1, in an exemplary embodiment, a network diagram illustrates an Ethernet network 10 with various nodes 12 (denoted as nodes 12-1-12-6) illustrating packet drops at network ingress. In an exemplary embodiment, the Ethernet network 10 can include a G.8032 ring utilizing Ethernet Ring Protection Switching described in ITU Recommendation G.8032/Y.1344 (08/15) "Ethernet Ring Protection Switching," the contents of which are incorporated by reference. Other embodiments are also contemplated for the Ethernet network 10. The nodes 12 are Ethernet switches with Network-Network Interface (NNI) ports between one another. In the example of FIG. 1, the Ethernet network 10 includes a switch 14 with a LAG bundle 16 to the node 12-1 and then reaching the node 12-4 over a G.8032 ring, for example. For OAM purposes, the nodes 12-1, 12-4 include per service UP Maintenance End Points (MEPs) 18 and the intermediate nodes 12-2, 12-3, 12-5, 12-6 include per service Maintenance Intermediate Points (MIPs). Also, for the G.8032 ring, a blocking port 22 is installed on a port associated with the node 12-5.

In operation, the switch 14 sends ingress packets to the node 12-1 destined for the node 12-4 over the LAG bundle 16. The switch 14 is unaware of packet drops 24 on a receive port of the node 12-1, and, in the case of frame loss, manual effort is needed for fault isolation/service recovery. The packet drops 24 can be referred to as service unaware port receive discards. Again, the possible causes of packet drops are link layer drops (CRC mismatch discards, Alignment errors, undersize/oversize frames, etc.) or service related drops. Such discards are known locally only to the node 12-1, and no recovery is done automatically. Some of these conditions may appear in the network 10 during run-time because of transient noise, hardware faults, etc. A user has to manually log in to the nodes 12 to debug such problems if the packet drops 24 happen somewhere in network 10.

Ethernet Network—Network Transit Port Discards

Figure 2:
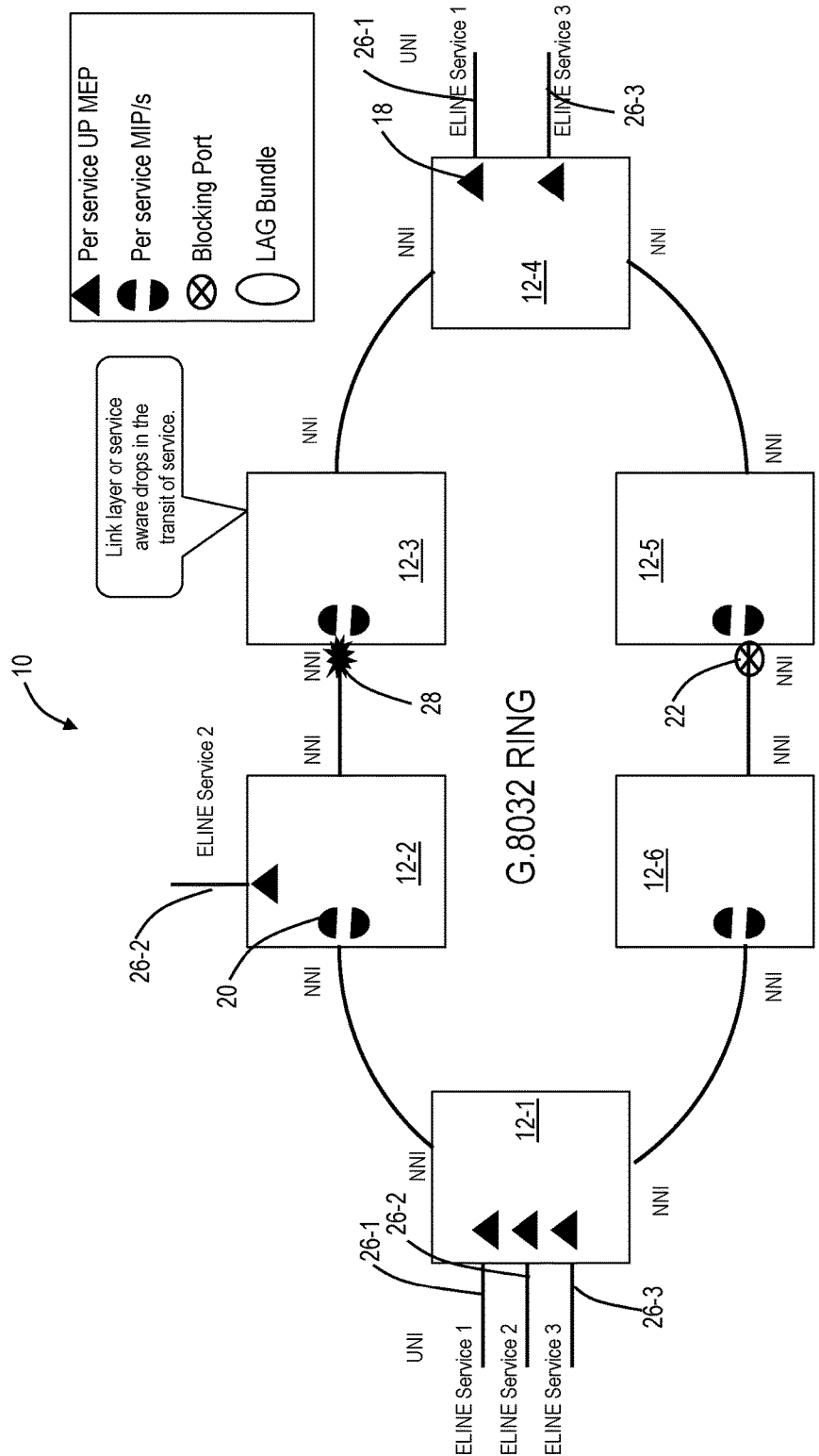
FIG. 2 is a network diagram of the Ethernet network of FIG. 1 illustrating packet drops during transit in the network.

Referring to FIG. 2, in an exemplary embodiment, a network diagram illustrates the Ethernet network 10 with various nodes 12 (denoted as nodes 12-1-12-6) illustrating packet drops during transit in the network 10. In FIG. 2, E-Line services 26 (denoted as E-Line services 26-1, 26-2, 26-3) are configured in the network 10. Specifically, the E-Line service 26-2 is configured between the nodes 12-1, 12-2, and the E-Line services 26-1, 26-3 are configured between the nodes 12-1, 12-4. The E-Line services 26 are defined in MEF Technical Specification 6.1 "Metro Ethernet Services Definitions Phase 2" (04/08), the contents of which are incorporated by reference. The E-Line service 26 is a point-to-point Ethernet service that connects two User-Network Interface (UNI) ports. In the example of FIG. 2, there are packet drops 28 at the node 12-3 and these packet drops 28 can be referred to as link layer and/or service aware frame drops. Again, service aware drops under the packet drops 28 can be caused by "No destination found," service layer QoS, Service MAC limit exceeded, etc. which happen after the incoming frames are mapped to the services 26. The packet drops 28 occurring inside the network 10 are not easily traceable. Connectivity Fault Management (CFM) checks for service connectivity only. However, CFM does not help in debugging issues where the service 26 is up, but some frame loss is happening in the network 10. Y.1731 Loss Measurement can tell loss in the delivery of service. However, there is no tool to isolate the point of frame loss and its cause.

Port Discard Propagation

In various exemplary embodiments, the systems and methods propagate discard information, e.g., related to the port discards 24, 28, to other nodes 12. For example, a service unaware port receive discard condition can be propagated to the other end of a link and propagate using an organization specific Type-Length-Value (TLV) in IEEE 802.1ab Link Layer Discovery Protocol (LLDP). This mechanism is extremely useful in propagating frame loss on a specific LAG member to the other end of the LAG. The Link layer and service aware port discard condition can be propagated to the edge of the administrative domain using an organization Specific TLV in IEEE 802.1ag Link trace message. This mechanism can be used in isolating the point of frame drops within the network 10.

In an exemplary embodiment for the service unaware port receive discard condition, link layer drops are propagated from the network ingress to the sender, i.e., the switch 14. This provides the sender switch 14 the capability to report an alarm and may optionally trigger switchover (if desired) based on a discard threshold and backup path state. Again, the link layer drops can be propagated using IEEE 802.1ab LLDP organization level TLV including the information about % packet drops (and the cause) happening on a port.

In another exemplary embodiment for the link layer Rx drops and service aware Rx/Relay failures during network transit, the drops can be exchanged with the sender switch 14 if service is observing a loss in end-to-end delivery. This can allow the sender switch 14 to isolate the point of failure and report a detailed description, such as to a Network Management System (NMS), Element Management System (EMS), etc. This can use an organization specific TLV in 802.1ag Link trace messages. If Loss Measurement test reports a loss in service delivery within a network, a user can run a Link trace from the network entry point to exit point and isolate the drop point. A TLV in a Link Trace Message (LTM) can probe MIPs and a Remote MEP (RMEP) to respond with % Rx and % Relay (i.e., forwarding) drops.

The LTM message can be able to convey the failures in which it is interested. A TLV in a Link Trace Response (LTR) can carry a node's statistics information. After analyzing all the LTRs from intermediate MIPs and terminating MEP, the software can be able to determine the point of failure in the network.

Service Unaware Port Receive Discard Propagation

Figure 3:
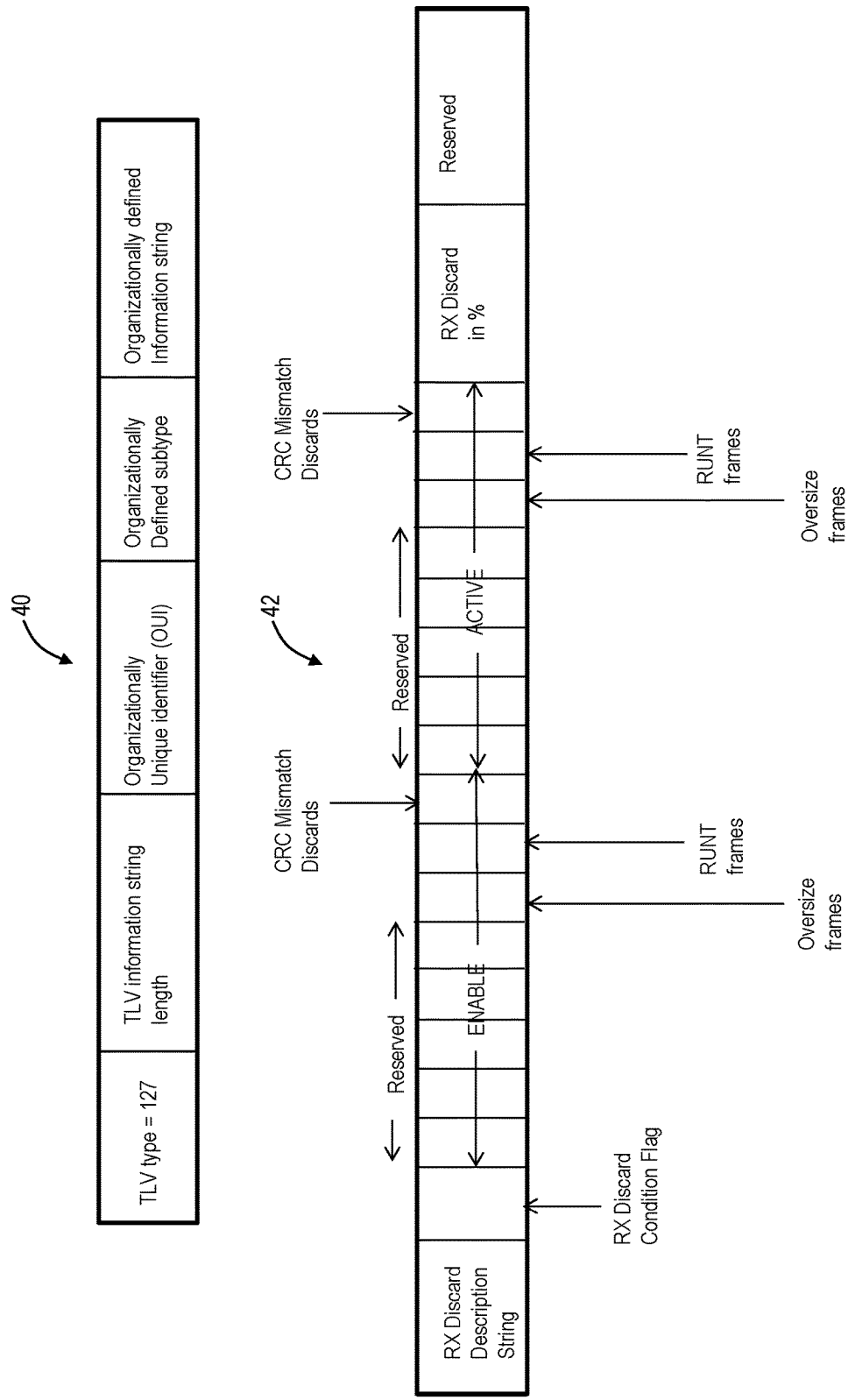
FIG. 3 is a block diagram of a Link Layer Discovery Protocol (LLDP) organization specific Type-Length-Value (TLV) and a TLV information string for service unaware port receive discard propagation.

Referring to FIG. 3, in an exemplary embodiment, a block diagram illustrates an LLDP organization specific TLV 40 and a TLV information string 42 for service unaware port receive discard propagation. The node 12-1 which is observing Rx discards (e.g., CRC mismatch drop, etc.) on certain port(s) is able to propagate this condition to its immediate neighbor switch 14 by transmitting LLDPDUs carrying "% Rx drop" in the new organization specific TLV 40. As LLDP runs at the link level, Rx discards of a LAG member can also be exchanged to the other end of the LAG. The percentage drop can be calculated as "(Discarded Frames Count in last monitored interval/Total Received frames in last monitored interval)×100." The last monitored interval can be configurable, and the default can be a LLDP default msgTxInterval (30 seconds). This mechanism is not limited to CRC mismatch/undersize/oversize discards. Implementations may incorporate other traffic drops such as "Port's MAC limit exceeded," etc. to cover possible failures/error scenarios in the network 10. The LLDP organization specific TLV 40 can be a TLV type of 127 and include the following fields:

| Field | Size | Description |
|---|---|---|
| TLV type | 7 bits | Standard recommended TLV type for organization specific TLV |
| TLV information string length | 9 bits | Length of TLV information string in Bytes. Shall include the size of OUI and subtype fields also. |
| Organizationally unique identifier | 3 Bytes | Organization's OUI |
| Organizationally defined subtype | 1 Byte | Organization defined unique subtype |

Note, other embodiments are also contemplated. The TLV information string 42 includes additional information related to the cause of the port discards. The TLV information string 42 can be based on the reason for the port discards. For example, the TLV information string 42 is shown based on CRC-related port discards. Other embodiments are also contemplated. For the example of CRC-related port discards, the TLV information string 42 can include:

| Field | Size | Description |
|---|---|---|
| RX Discard Description String | 22 Bytes | TLV description string=>"Rx Discard Description" |
| Rx Discard Condition Flag | 1 Byte | Bit 0: 0 if no frame discard has happened in last monitored interval; 1 if frames are getting discarded during last monitored interval<br>Bit 1-7: Reserved for future<br>Implementation may use reserved bits to propagate additional information such as discard state in terms of absolute numbers. |
| Enable | 1 Byte | Enable bits to convey which failures shall be considered by the organization for counting discarded frames.<br>Bit 0: CRC mismatch discards<br>Bit 1: RUNT Frames<br>Bit 2: Oversize frames<br>Bits 3-7: Reserved for future<br>Implementation shall use this field to turn on which all discard conditions they want to propagate to the sender. Implementations may use reserved fields to include additional fault conditions, if required. |

-continued

| Field | Size | Description |
| --- | --- | --- |
| Active | 1 Byte | Active bits to convey which discard conditions were active during last monitored interval.<br>Bit 0: CRC mismatch discards<br>Bit 1: RUNT Frames<br>Bit 2: Oversize frames<br>Bits 3-7: Reserved for future<br>Active bits shall always be a subset of Enable bits. |
| Rx Discard in % | 6 Bytes | % discard in decimal (up to 3 digits beyond decimal).<br>% discard = (Total discards in last monitored interval/Total Rx frames in last monitored interval) × 100<br>Total discards shall include frames discarded by the reasons which are enabled in the "Enable" field. |
| Reserved | 8 Bytes | For future use |

A RUNT frame is an Ethernet frame that is less than the minimum length of 64 bytes with bad Frame Check Sequence (FCS) (whereas undersize frames <64 bytes with good FCS). In a half-duplex Ethernet environment, runt frames are almost always caused by collisions. A Link Layer Discovery Protocol Data Unit (LLDPDU), operating at the switch 12-1, is able to convey this information to an immediate neighbor, e.g., the switch 14. Also, a subscriber network, e.g., a network associated with the switch 14, can exchange this information with a far end subscriber network by tunneling LLDPDU across provider network(s), e.g., the nodes 12 in the G.8032 ring. Implementations may use information received in this TLV according to network configuration and fault location. Also, a "discard threshold" per port level can be configured so that a corrective action can be initiated when failures exceed the configured threshold. This mechanism is not limited to any specific network topology (i.e., G.8032). Thus, any specific corrective action may be based on the specific network topology.

The following illustrate non-limiting examples of scenarios where this TLV can be applied to convey frame drops information. First, for Link Aggregation having Active/Standby members, the LLDP protocol runs on LAG member ports, e.g., the LAG bundle 16. It is recommended that all LAG members are configured with identical "discard threshold" at both ends. If an active LAG member reports frame discards at the receiver because of reasons such as CRC mismatch, RUNT, Alignment errors, etc. beyond configured threshold, the receiver node can report a "Signal Degrade" condition on a LAG member port and it can start sending this information in the LLDPDU to the other end of the link. If the percentage discard is greater than the configured threshold at the other end, the other end can report a "Remote Signal Degrade" condition on the active LAG member port. An implementation may soak these conditions over certain soak period before reporting the condition.

A LAG engine associated with the LAG bundle 16 can listen to these "Signal Degrade"/"Remote Signal Degrade" conditions and may trigger protection switchover if a backup link is operationally up and does not have any "Signal Degrade"/"Remote Signal Degrade" condition already. The "Signal Degrade"/"Remote Signal Degrade" condition may not be cleared automatically even if frame discards stop (because of switchover on the backup link). It may require manual intervention to debug/isolate the issue using test traffic before manually clearing the condition on the degraded ports.

Second, for an Ethernet Private Line (EPL) service 26 in an end-to-end L2 network, customers may want to run LLDP end-to-end to discover their own sites. To allow this, an edge node, e.g., the switch 12-1, in the provider network can be configured to tunnel incoming LLDPDUs at ingress UNIs. In this case, a new organization specific TLV can be used to exchange faults because of wrong Source Address (SA), MAC limit exceeded, etc. so that sender can be aware of issues with transmitted frames.

Service Aware Port Discard Propagation

Figure 4:
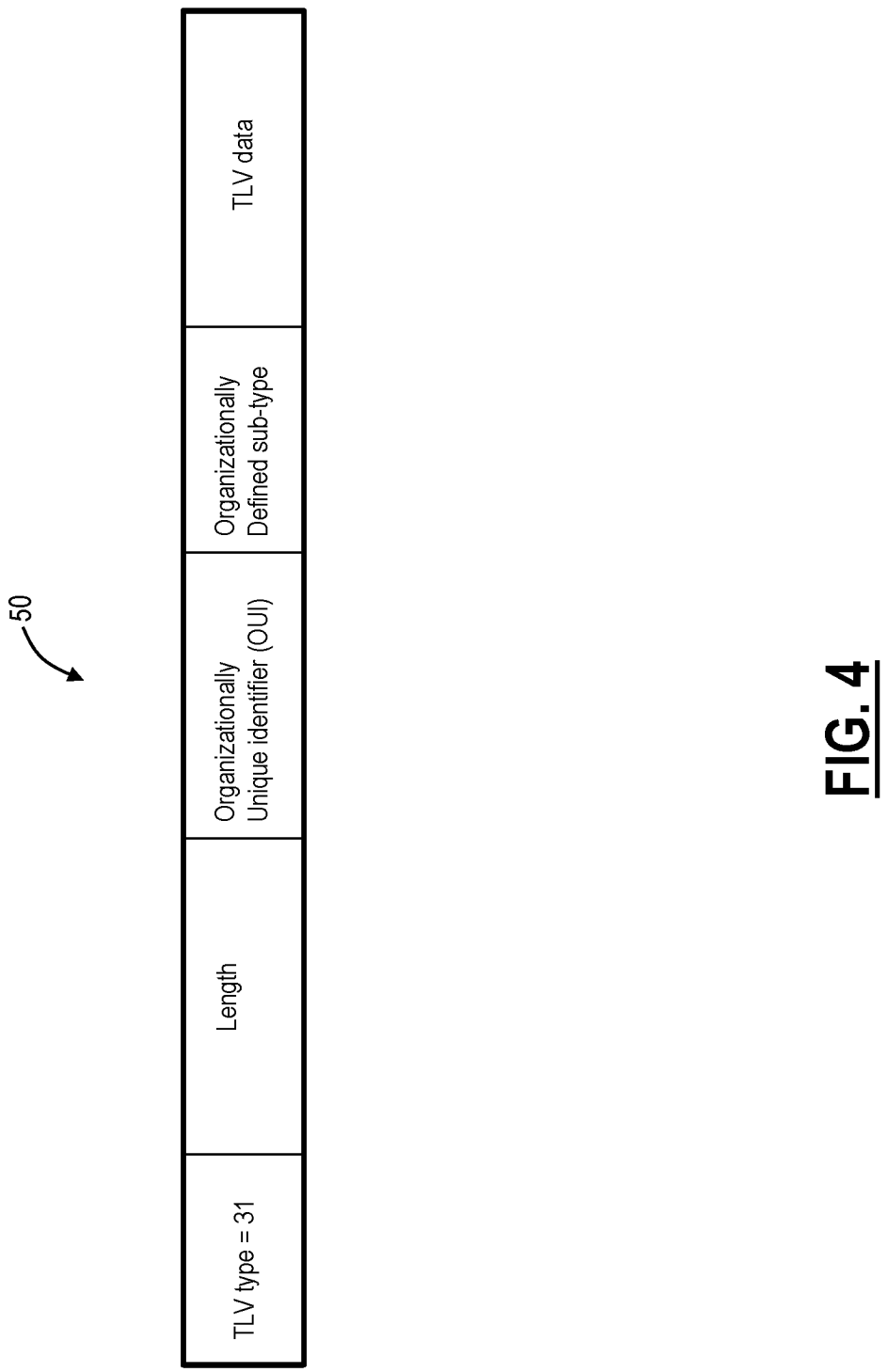
FIG. 4 is a block diagram of a Link trace organization specific TLV for service aware port discard propagation.
Figure 5:
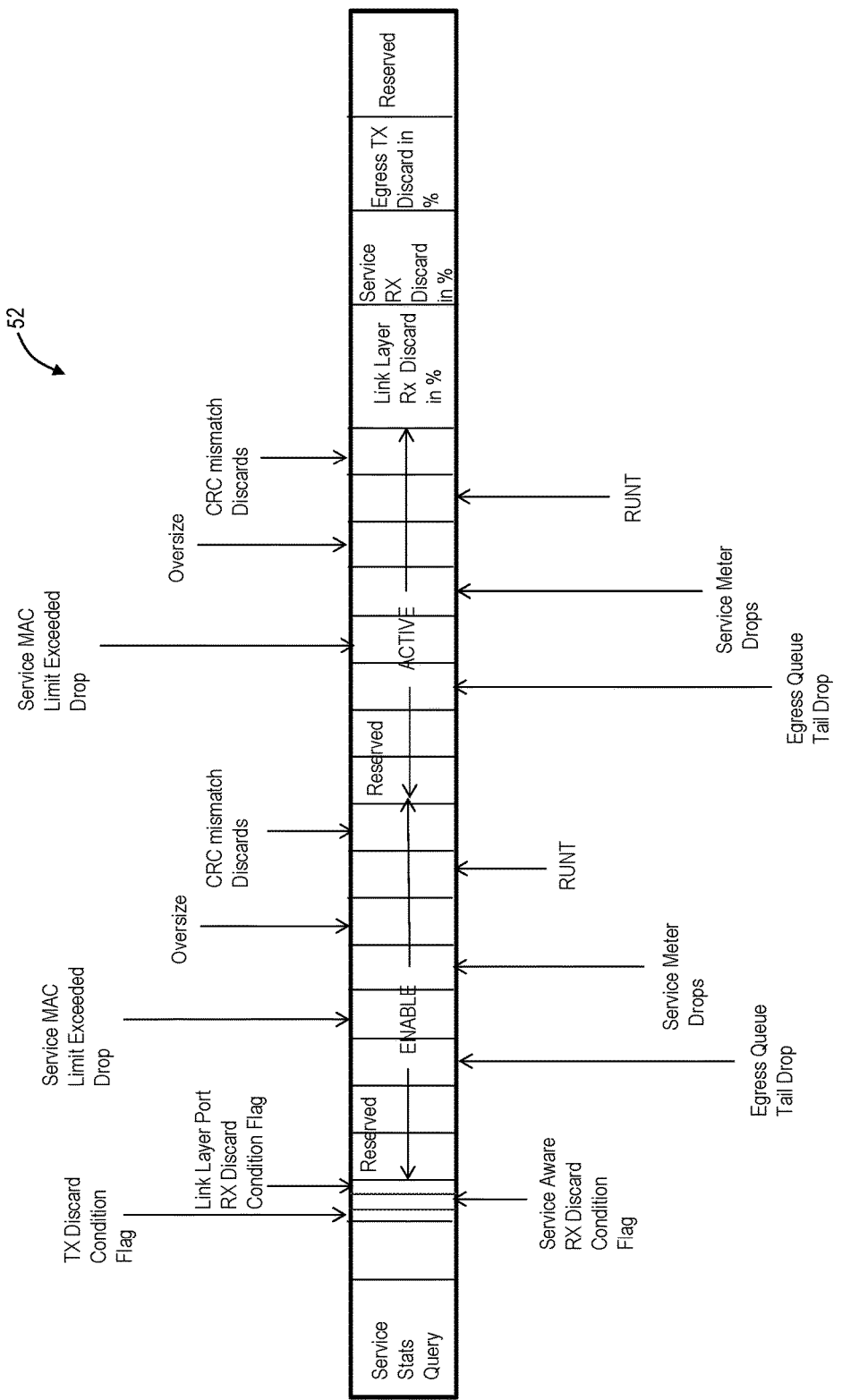
FIG. 5 is a block diagram of a query TLV information string for service aware port discard propagation.
Figure 6:
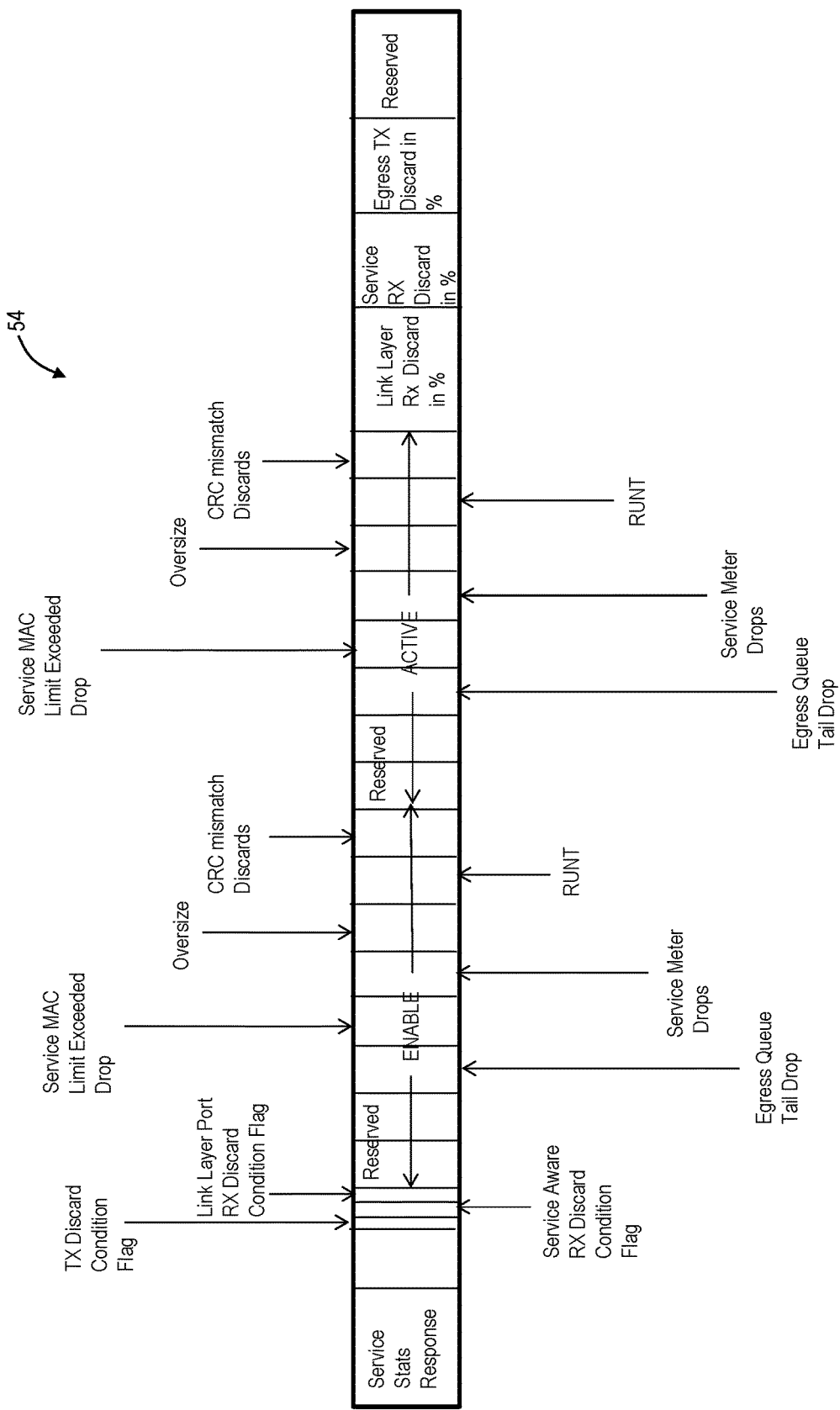
FIG. 6 is a block diagram of a response TLV information switch for service aware port discard propagation.

Referring to FIGS. 4, 5, and 6, in an exemplary embodiment, block diagrams illustrate a Link trace organization specific TLV 50 (FIG. 4), a query TLV information string 52 (FIG. 5), and a response TLV information switch 54 for service aware port discard propagation. Again, in a L2 network, e.g., the network 10, service connectivity can be monitored using the IEEE 802.1ag CFM protocol. However, if service is up, CFM does not help in detecting partial frame loss(es) in the network 10. Y.1731 performance monitoring tools help in this regard. Service performance monitoring with respect to frame drops can be performed using Y.1731 Loss Measurement tests. However, even though Loss Measurement tests show frame loss in end-to-end service delivery within an administrative domain, there is no way to isolate the point of frame loss in the network 10. Thus, the systems and methods propose an organization specific TLV "Service Stats Query/Response" TLV in 802.1ag Linktrace messages which can be used to retrieve service related % discard information from intermediate nodes (i.e., MIPs) and terminating node (Remote MEP).

To retrieve service stats from intermediate nodes 12-2, 12-3, 12-5, 12-6, Maintenance Intermediate endpoints (MIPs) are configured at a monitored Maintenance Domain (MD) level. Y.1731 Loss Measurement tests are point-to-point and run between two MEPs of a service 26, i.e., the switches 12-1, 12-4. In case the Loss measurement (LM) initiator observes loss in end-to-end service delivery, a user can initiate a Link trace test with a frame discards probe enabled from the LM initiator and/or responder nodes. "Service Stats Query" TLV can be included in the Link trace query message while a Link trace reply can include "Service Stats Response" TLV. It is recommended to run two link trace tests so that a LTR reply can provide delta discards.

FIG. 4 illustrates details of the Link trace organization specific TLV 50. The Link trace organization specific TLV 50 can be a TLV type of 31 and include the following fields:

| Field | Size | Description |
| --- | --- | --- |
| TLV type | 1 Byte | Standard recommended TLV type for organization specific TLV |

| Field | Size | Description |
| --- | --- | --- |
| TLV information string length | 2 Byte | Length of TLV information string in Bytes. Shall include the size of OUI and subtype fields also. |
| Organizationally unique identifier | 3 Bytes | Organization's OUI |
| Organizationally defined subtype | 1 Byte | Organization defined unique subtype. Sub Type shall be implementation specific depending on a number of organization specific TLVs encapsulated within LTM frame. |

FIG. 5 illustrates details of the query TLV information string 52 which includes the following fields:

| Field | Size | Description |
| --- | --- | --- |
| Service Stats Query | 1 Byte | TLV type: 1 for Query |
| Flag | 1 Byte | Flag indicating which discards initiator is querying.<br>Bit 0: Link Layer Rx Discard<br>Bit 1: Service aware RX Discard<br>Bit 2: Service Aware Tx Discard<br>Bits 3-7: Reserved for future<br>An implementation may use reserved bits for propagating additional information. |
| Enable | 1 Byte | Enable bits to convey which failures Initiator is interested in.<br>The implementation shall use this field to turn on which all discard conditions they want to query from transit and terminating node. Implementations may use reserved fields to include additional fault conditions if required. |
| Active | 1 Byte | Not Applicable |
| Ingress Link Layer Rx Discard in % | 6 Bytes | Not Applicable |
| Ingress Service Aware Rx Discard in % | 6 Bytes | Not Applicable |
| Egress Tx Discard in % | 6 Bytes | Not Applicable |
| Reserved | 8 Bytes | For future |

The initiator, e.g., the node 12-1, can send a LTM targeted to service remote endpoint with "Service Stats Query" TLV included. Intermediate MIPs, e.g., the nodes 12-2, 12-3, 12-5, 12-6, can respond to the Link trace with a corresponding Link trace Response message. The Link trace Response can include a "Service Stats response" message with Rx discard stats of ingress port and Tx drop stats of egress port on which LTM is being relayed to the next hop. The LTM target node (i.e., terminating node such as the node 12-4) can reply with Rx discard stats of ingress port only.

If a Y.1731 LM test initiator observes far-end Loss, the LTM should be initiated from the LM initiator. If a Y.1731 LM test initiator observes near-end loss, the LTM should be initiated from LM responder.

FIG. 6 illustrates details of the response TLV information string 54 which includes the following fields:

| Field | Size | Description |
| --- | --- | --- |
| Service Stats Response | 1 Byte | TLV type: 2 for Response |
| Flag | 1 Byte | Bit 0: 0 if no Link layer frame discard is happening at Rx; 1 if link layer frames are getting discarded<br>Bit 1: 0 if no service aware frame discard is happening at Rx; 1 if service aware frames are getting discarded<br>Bit 2: 0 if no tail drop is happening at egress; 1 if tail drop is happening at egress<br>Bits 3-7: Reserved for future |
| Enable | 1 Byte | Enable bits to convey which failures have been considered by the responder for counting discarded frames.<br>The implementation shall use this field to turn on which all discard conditions they want to propagate to the sender. Implementations may use reserved fields to include additional fault conditions if required. |

| Field | Size | Description |
| --- | --- | --- |
| Active | 1 Byte | Active bits to convey which discard conditions are active at the time of transmission of LTR. Active bits shall be a subset of enable bits. |
| Ingress Link Layer Rx Discard in % | 6 Bytes | % discard in decimal (up to 3 digits beyond decimal). % discard = (Total discards at Port because of link layer failures/Total Rx frames on the port) × 100 Total discards shall include frames discarded by the link layer drop reasons which are enabled in the "Enable" field. Frames shall be counted from the last time when LTR having this TLV has been generated. |
| Ingress Service Aware Rx Discard in % | 6 Bytes | % discard in decimal (up to 3 digits beyond decimal). % discard = (Total discards at Service/Total Rx frames on the service) × 100 Total discards shall include frames discarded by the service aware drop reasons which are enabled in the "Enable" field. Frames shall be counted from the last time when LTR having this TLV has been generated. |
| Egress Tx discard in % | 6 Bytes | % discard in decimal (up to 3 digits beyond decimal). % discard = (Total tail drops/Total Tx frames for this service) × 100 Total discards shall include frames discarded by the egress Tx drop reasons which are enabled in the "Enable" field. Frames shall be counted from the last time when LTR having this TLV has been generated. |
| Reserved | 8 Bytes | For future |

After analyzing the LTR responses, the software shall be able to isolate the point of failure in the network 10. Link Layer discards are a reflection of service unaware drops at the ingress port while service aware Rx drops and egress Tx drops shall provide information about service specific drops. Successive Link trace tests shall result in delta frame loss information. This mechanism may be run manually when frame loss exceeds a configured threshold or implementations may trigger it automatically whenever Y.1731 LM test reports "frame loss threshold reached."

Ethernet Network—Ingress Port Discards Example

Figure 7:
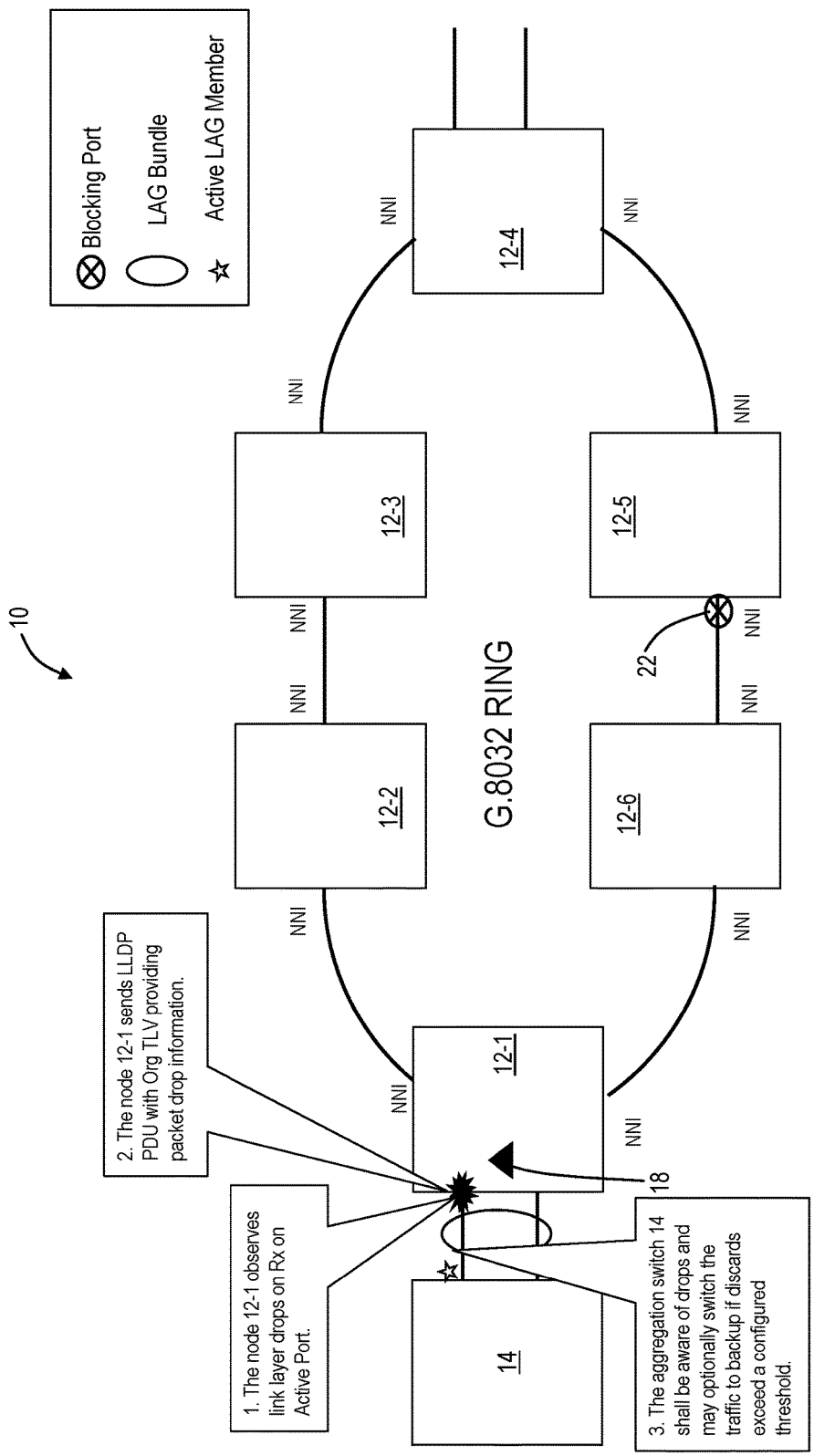
FIG. 7 is a network diagram of the Ethernet network of FIG. 1 illustrating packet drops at network ingress and an example of the port discard propagation based thereon.

Referring to FIG. 7, in an exemplary embodiment, a network diagram illustrates the Ethernet network 10 illustrating packet drops at network ingress and an example of the port discard propagation based thereon. Here, the node 12-1 observes link layer drops on reception on the active port on the LAG bundle 12 from the switch 14. The node 12-1 sends an LLDPDU with the organization TLV providing packet drop information to the switch 14. The switch 14 is aware of drops, based on the LLDPDU, and may optionally switch the traffic to the backup port if discards exceed a configured threshold.

Ethernet Network—Network Transit Port Discards Example

Figure 8:
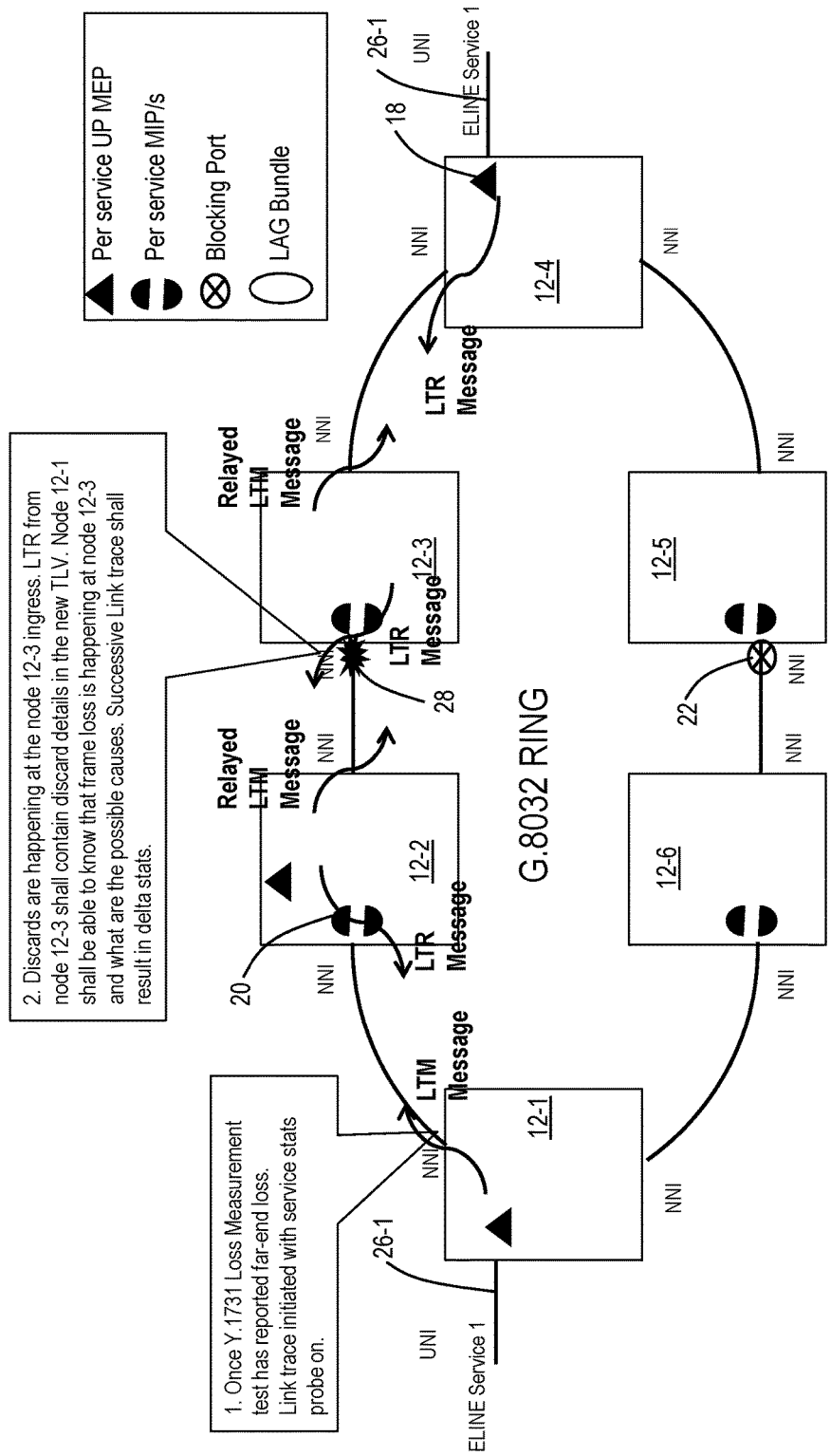
FIG. 8 is a network diagram of the Ethernet network of FIG. 2 illustrating packet drops during transit in the network and an example of the port discard propagation based thereon.

Referring to FIG. 8, in an exemplary embodiment, a network diagram illustrates the Ethernet network 10 illustrating packet drops during transit in the network 10 and an example of the port discard propagation based thereon. Here, the service 26-1 is experiencing frame loss somewhere in the network, such as the packet drops 28, but this location is unknown. A Y.1731 Loss Measurement test can be used to report a far-end loss on the service 26-1, based on the packet drops 28. A Link trace can be initiated at the node 12-1 with a services stats probe set to on. This includes sending a LTM from the node 12-1 to the node 12-4 via the nodes 12-2, 12-3, each of which relays the LTM forward and send an LTR to the node 12-1. The port drops 28 are happening at the node 12-3 ingress. The LTR from the node 12-3 shall contain discard details in the new TLV. The node 12-1 shall be able to know that frame loss is happening at the node 12-3 and what are the possible causes. Successive Link traces shall result in delta stats.

Exemplary Node

Figure 9:
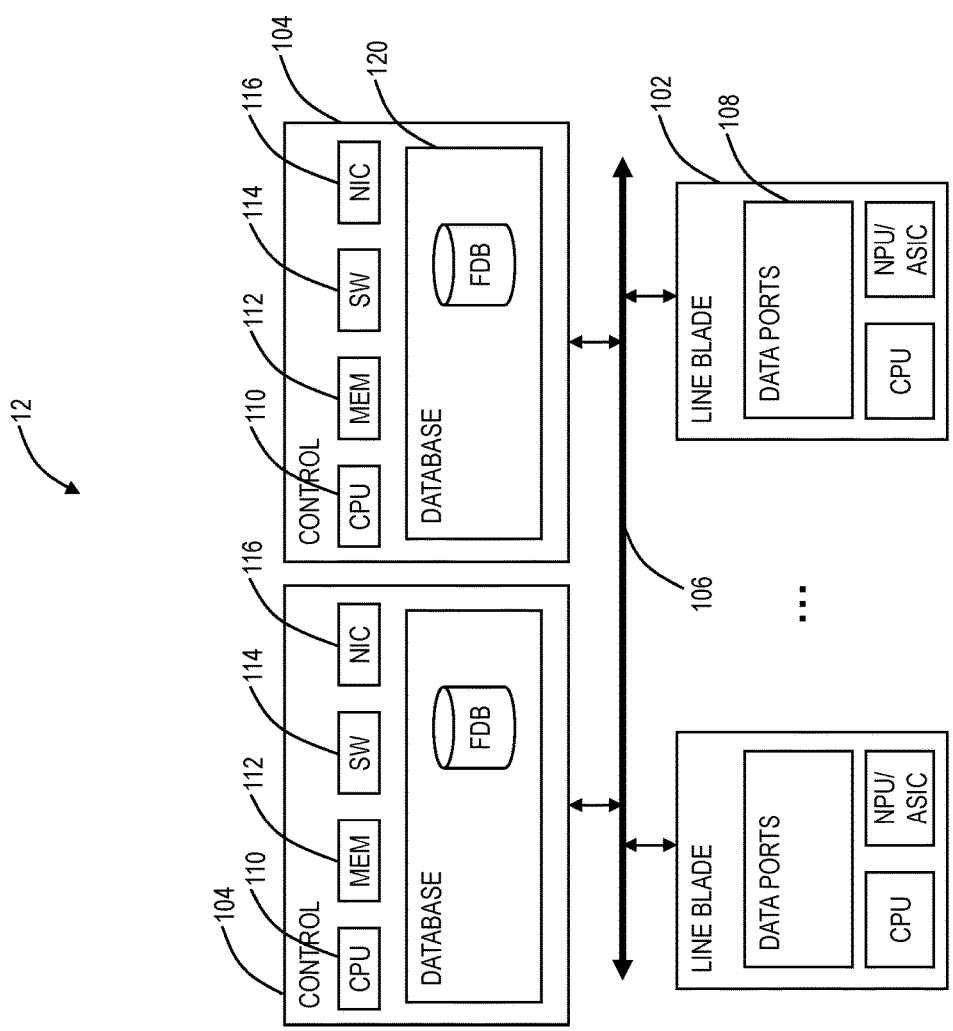
FIG. 9 is a block diagram of an exemplary implementation of a node in the Ethernet networks of FIGS. 1 and 2.

Referring to FIG. 9, in an exemplary embodiment, a block diagram illustrates an exemplary implementation of a node 12. In this exemplary embodiment, the node 12 is an Ethernet network switch, but those of ordinary skill in the art will recognize the systems and methods described herein contemplate other types of network elements and other implementations. In this exemplary embodiment, the node 12 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 12. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 12 out by the correct port 108 to the next node 12. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 12. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB). In this exemplary embodiment, the node 12 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 12.

In an exemplary embodiment, the node 12 is adapted to propagate packet drop information in the Ethernet network 10. The node includes circuitry adapted to detect one or more of service unaware discards; circuitry adapted to determine statistics based on the one or more of service unaware discards; and circuitry adapted to transmit the determined statistics to a sender node through a Link Layer Discovery Protocol Data Unit (LLDPDU). The determined statistics can be utilized by the sender node to perform one or more corrective actions responsive to the determined statistics exceeding a threshold. The one or more corrective actions can include one or more of switching to backup Link Aggregation Group member ports, manipulating a blocking port in the Ethernet network, and raising an alarm. The LLDPDU can include an organization specific Type-Length-Value (TLV) with a TLV information string therein based on the determined statistics and cause of the one or more of service unaware discards and service aware port discards.

The service unaware discards can be due to one or more of Cyclic Redundancy Check (CRC) mismatch, alignment error, and RUNT frames, prior to mapping packets to associated services, and the service aware port discards can be due to one or more of failure to find a destination, Service level Quality of Service (QoS), and Service Media Access Control (MAC) limit, during transit over a service in the Ethernet network. The one or more of service unaware discards and service aware port discards can include service unaware discards prior to mapping packets to a service, and the transmitting is to the sender node which is an intermediate neighbor node where the packets ingress into the Ethernet network. The determined statistics can include a percentage drop over a monitored interval. The one or more of service unaware discards and service aware port discards can include service aware port discards after mapping packets to a service and in transit through the Ethernet network, and the transmitting is to the sender node where the packets ingress into the Ethernet network. The detecting can be responsive to a frame loss measurement, and the LLDPDU is a Link Trace Response (LTR) transmitted in response to a Link Trace Message (LTM).

Port Discard Propagation Process

Figure 10:
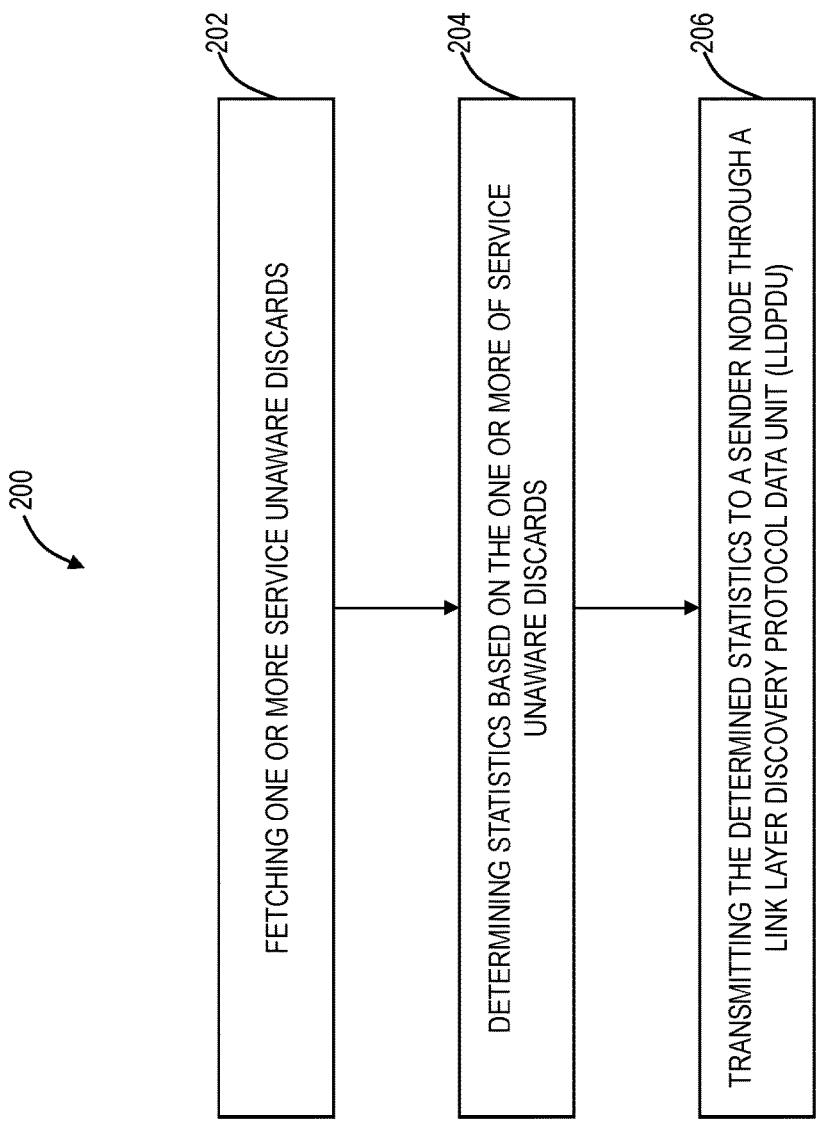
FIG. 10 is a flowchart of an Ethernet port discard propagation process using Link Layer Discovery Protocol Data Units (LLDPDUs)

Referring to FIG. 10, in an exemplary embodiment, a flowchart illustrates a process 200 of propagating packet drop information by a node in an Ethernet network. The process 200 includes fetching one or more service unaware discards (step 202); determining statistics based on the one or more of service unaware discards (step 204); and transmitting the determined statistics to a sender node through a Link Layer Discovery Protocol Data Unit (LLDPDU) (step 206). The determined statistics can be utilized by the sender node to perform one or more corrective actions responsive to the determined statistics exceeding a threshold. The one or more corrective actions can include one or more of switching to backup Link Aggregation Group member ports, manipulating a blocking port in the Ethernet network, and raising an alarm. The LLDPDU can include an organization specific Type-Length-Value (TLV) with a TLV information string therein based on the determined statistics and cause of the one or more of service unaware discards.

Figure 11:
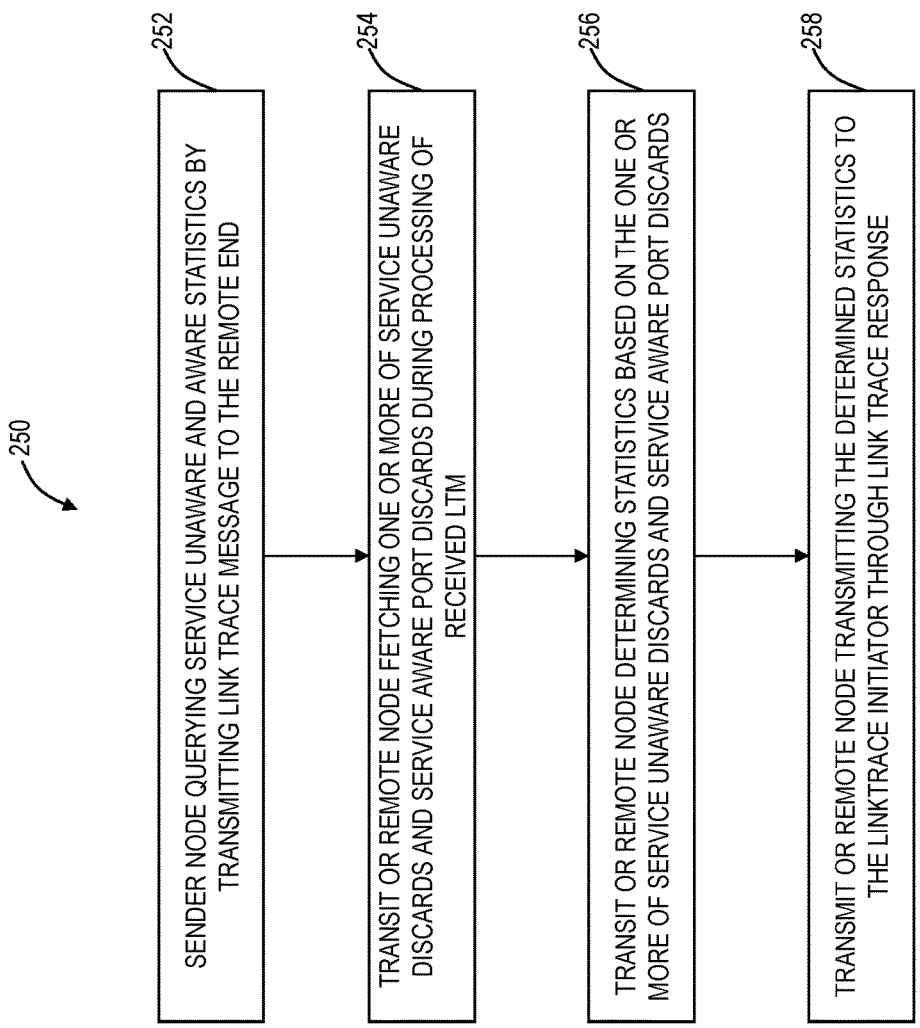
FIG. 11 is a flowchart of an Ethernet port discard propagation process using Link Trace Messages.

Referring to FIG. 11, in an exemplary embodiment, a flowchart illustrates an Ethernet port discard propagation process 250 using Link Trace Messages (LTM). Note, in the process 200, LLDPDUs are used to propagate service unaware port discards to a sender. Sender should be a neighboring node. It is part of LLDP. The LTMs are part of IEEE 802.1ag and the systems and methods described herein propose to add Org-Specific TLVs in LTM/LTR messages to propagate service unaware as well as service aware Rx discards and service aware Tx (i.e., forwarding") discards, if applicable. The process 250 includes a sender node querying service unaware and aware statistics by transmitting a Link Trace Message (LTM) to the remote end (step 252); the transit or remote node fetching one or more of service unaware discards and service aware port discards during processing of a received LTM (step 254); the transit or remote node determining statistics based on the one or more of service unaware discards and service aware port discards (step 256); and the transmit or remote node transmitting the determined statistics to the link trace initiator through a Link Trace Response (LTR) (step 258).

The service unaware discards can be due to one or more of Cyclic Redundancy Check (CRC) mismatch, alignment error, and RUNT frames, prior to mapping packets to associated services, and the service aware port discards can be due to one or more of failure to find a destination, Service level Quality of Service (QoS), and Service Media Access Control (MAC) limit, during transit over a service in the Ethernet network. The one or more of service unaware discards and service aware port discards can be service unaware discards prior to mapping packets to a service, and the transmitting is to the sender node which is an intermediate neighbor node where the packets ingress into the Ethernet network. The determined statistics can include a percentage drop over a monitored interval. The one or more of service unaware discards and service aware port discards can be service aware port discards after to mapping packets to a service and in transit through the Ethernet network, and the transmitting is to the sender node where the packets ingress into the Ethernet network. The detecting can be responsive to a frame loss measurement, and a Link Trace Response (LTR) transmitted in response to a Link Trace Message (LTM).

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of propagating frame loss information by a node in an Ethernet network, the method comprising:
    fetching service unaware discards and service aware port discards, each comprising a number of discards in a monitored interval from zero to an absolute number;
    determining statistics based on the service unaware discards and the service aware port discards; and
    transmitting the determined statistics to a sender node through a Link Layer Discovery Protocol Data Unit (LLDPDU) for the service aware port discards and a Link Trace Message (LTM) for the service unaware discards, wherein the determined statistics are utilized by the sender node to perform one or more corrective actions responsive to the determined statistics exceeding a threshold,
    wherein the service unaware discards are due to one or more of Cyclic Redundancy Check (CRC) mismatch, alignment error, and RUNT frames, prior to mapping packets to associated services, and
    wherein the service aware port discards are due to one or more of failure to find a destination, Service level Quality of Service (QoS), and exceeding Service Media Access Control (MAC) limit, during transit over a service in the Ethernet network.

2. The method of claim 1, wherein the one or more corrective actions comprise one or more of switching to backup Link Aggregation Group member ports, manipulating a blocking port in the Ethernet network, and raising an alarm.

3. The method of claim 1, wherein the service unaware discards comprise service unaware discards prior to mapping packets to a service.

4. The method of claim 3, wherein the determined statistics comprise a percentage drop over the monitored interval.

5. The method of claim 1, wherein the service unaware discards and service aware port discards comprise service aware port discards after mapping packets to a service and in transit through the Ethernet network.

6. The method of claim 5, wherein the determining is responsive to a loss reported by a frame loss measurement tool and transmission of the LTM comprising an Organization specific TLV.

7. The method of claim 1, wherein the LTM comprises an organization specific Type-Length-Value (TLV) querying one or more service unaware and service aware discards and a Link Trace Response (LTR) comprises an organization specific Type-Length-Value (TLV) with a TLV information string based on the determined statistics and causes of one or more service unaware and service aware discards.

8. A node adapted to propagate frame loss information in an Ethernet network, the node comprising:
    circuitry adapted to fetch service unaware discards and service aware port discards, each comprising a number of discards in a monitored interval from zero to an absolute number;
    circuitry adapted to determine statistics based on the service unaware discards and the service aware port discards; and
    circuitry adapted to transmit the determined statistics to a sender node through a Link Layer Discovery Protocol Data Unit (LLDPDU) for the service aware port discards and a Link Trace Message (LTM) for the service unaware discards, wherein the determined statistics are utilized by the sender node to perform one or more corrective actions responsive to the determined statistics exceeding a threshold,
    wherein the service unaware discards are due to one or more of Cyclic Redundancy Check (CRC) mismatch, alignment error, and RUNT frames, prior to mapping packets to associated services, and
    wherein the service aware port discards are due to one or more of failure to find a destination, Service level Quality of Service (QoS), and Service Media Access Control (MAC) limit, during transit over a service in the Ethernet network.

9. The node of claim 8, wherein the one or more corrective actions comprise one or more of switching to backup Link Aggregation Group member ports, manipulating a blocking port in the Ethernet network, and raising an alarm.

10. The node of claim 8, wherein the service unaware discards comprise service unaware discards prior to mapping packets to a service.

11. The node of claim 10, wherein the determined statistics comprise a percentage drop over the monitored interval.

12. The node of claim 8, wherein the service unaware discards and service aware port discards comprise service aware port discards after to mapping packets to a service and in transit through the Ethernet network.

13. The node of claim 12, wherein the statistics are determined responsive to a frame loss measurement and a Link Trace Response (LTR) message transmitted in response to the LTM.

14. An Ethernet network, comprising:
    a plurality of interconnected nodes,
        wherein the plurality of interconnected nodes each comprises circuitry adapted to fetch service unaware discards and service aware port discards, each comprising a number of discards in a monitored interval from zero to an absolute number, circuitry adapted to determine statistics based on the service unaware discards and the service aware port discards, and circuitry adapted to transmit the determined statistics to a sender node through a Link Layer Discovery Protocol Data Unit (LLDPDU) for the service aware port discards and a Link Trace Message (LTM) for the service unaware discards, wherein the determined statistics are utilized by the sender node to perform one or more corrective actions responsive to the determined statistics exceeding a threshold, wherein the service unaware discards are due to one or more of Cyclic Redundancy Check (CRC) mismatch, alignment error, and RUNT frames, prior to mapping packets to associated services, and wherein the service aware port discards are due to one or more of failure to find a destination, Service level Quality of Service (QoS), and Service Media Access Control (MAC) limit, during transit over a service in the Ethernet network.

* * * * *